United States Patent [19]
Steward

[11] 3,718,965
[45] March 6, 1973

[54] PIERCE NUT INSTALLATION HEAD

[75] Inventor: Jerry H. Steward, Bloomfield Hills, Mich.

[73] Assignee: Multifastener Corporation, Detroit, Mich.

[22] Filed: June 3, 1971

[21] Appl. No.: 149,516

[52] U.S. Cl.............................29/211 D, 29/200 P
[51] Int. Cl...........................B23q 7/10, B23p 19/00
[58] Field of Search.....29/211 D, 200 P, 200 B, 432, 29/432.1; 227/2; 221/13

[56] References Cited

UNITED STATES PATENTS 3,098,576  7/1963  Steward............................221/13 X Primary Examiner—Thomas H. Eager
Attorney—Cullen Settle Sloman & Cantor

[57] ABSTRACT

The disclosure relates to an installation head apparatus, particularly suitable for securing a piercing fastener in a panel. The disclosed installation head includes a reciprocating plunger and a guide housing having a passage which receives the plunger and a plurality of pierce nuts in vertically stacked relation. The preferred embodiment of the guide housing provides an interference fit at the pierce nut corners to retain the nuts in the guide passage and explosion channels at the open end of the pierce nut passage which, in the event a pierce nut is fractured during the installation, receives the pierce nut fragments, guides the fragments away from the passage and prevents damage to the pierce nuts remaining in the passage.

9 Claims, 9 Drawing Figures

PATENTED MAR 6 1973

INVENTOR.
JERRY H. STEWARD.
BY
CULLEN, SETTLE, SLOMAN & CANTOR.
ATT'YS.

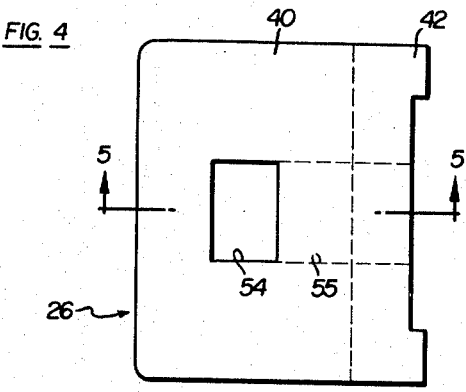
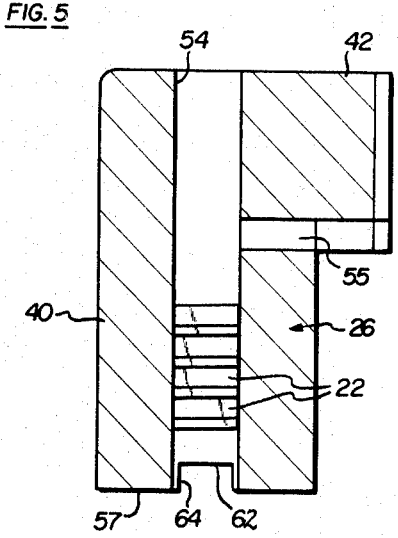
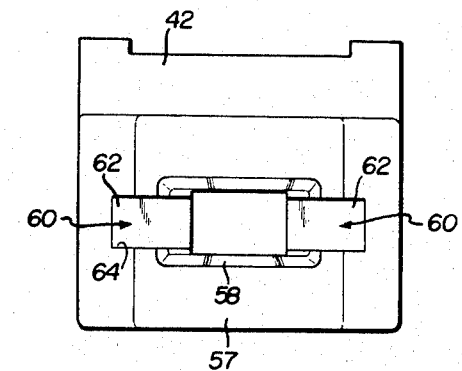
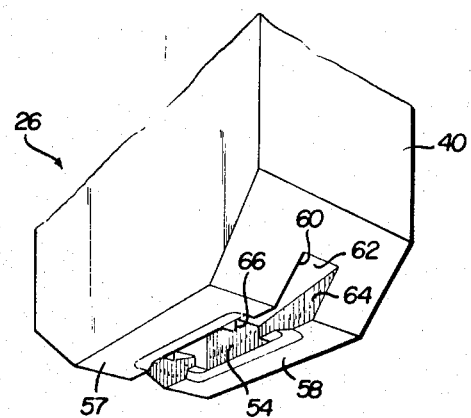

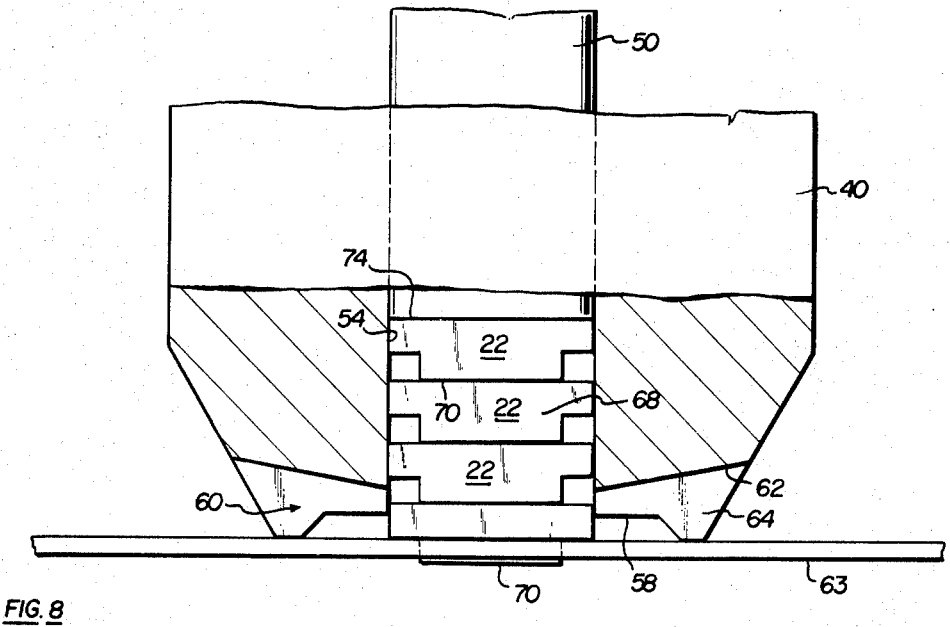
FIG. 8
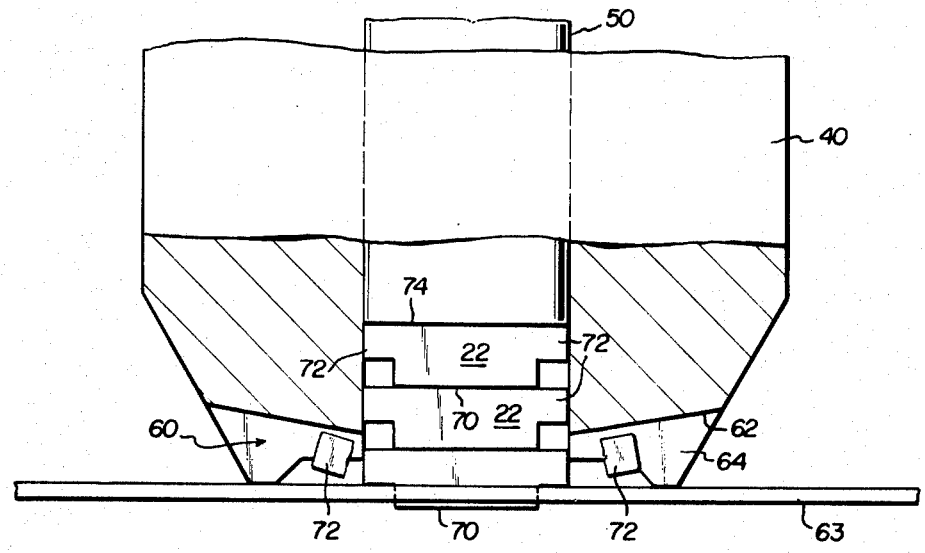
FIG. 9
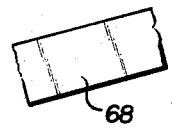

PIERCE NUT INSTALLATION HEAD

FIELD OF THE INVENTION

The installation head of the invention is particularly suitable for securing pierce nuts in a panel or the like. A pierce nut has a pilot portion which pierces its own hole in a panel and a flange portion which overlies the panel adjacent the pierced hole. During installation of the pierce nut, the panel may be deformed into suitable grooves provided in the nut, such as disclosed in U. S. Pat. No. 3,187,796, which is assigned to the assignee of the instant application, or the pierce nut may be deformed to retain the panel.

The preferred embodiment of the pierce nut installation head receives a plurality of nuts in vertical stacked relation for sequential installation in a panel adjacent the head. The installation head includes an actuatable plunger, a guide member or housing having an open ended passage which receives the plunger and releasably retains the nuts in the vertical stacked relation. The plunger is actuatable to forcibly engage the uppermost nut in the nut stack and force the lowermost nut out of the open end of the passage to pierce the panel and retain the pierce nut in the panel. In the disclosed embodiment of the pierce nut head, the guide housing passage engages the corners of the nuts to provide an interference fit, thereby retaining the nuts in the passage for engagement by the plunger. The disclosed embodiment of the pierce nuts are generally rectangular and the guide housing passage is also generally rectangular with radiused corners providing a four point interference fit with the pierce nuts.

In certain pierce nut installation applications, it may be possible to recycle the installation head after a pierce nut has been installed in the panel. The pierce nut head may be installed in a press platen, for example, wherein the pierce nut is installed in the panel during the forming of the panel. If the head is damaged or jammed, the press may be damaged. Further, the press must be disassembled and the head repaired of replaced, resulting in expensive delays. The pierce nut head of this invention avoids damage due to recycling of the head by providing channels at the open end of the guide housing passage which communicate with the passage and are open remote from the passage. In the event that the installation head is recycled after installation of a first nut, the second nut is forced into the pierced hole previously occupied by the first pierce nut. The pilot portion is thus forced through the panel, but the flange portion is sheared or fractured and may cause damage to the head assembly. The channels thus serve at least three functions: (1) the channels receive the pierce nut fragments, (2) the channels guide the fragments away from the guide housing passage, and (3) the channels prevent damage to the pierce nuts remaining in the passage. In the disclosed embodiment, the bottom wall of the channels are inclined away from the plane of the panel, thereby conducting the pierce nut fragments away from the panel.

Other improvements and meritorious features of the invention will more fully appear from the following description of the preferred embodiment, /claims and drawings.

BRIEF DESCRIPTION OF THE DRAWINGS

FIG. 4 is a top view of the guide housing shown in FIG. 1;

FIG. 5 is a side cross sectional view of the guide housing shown in FIG. 4, in the direction of view arrows 5—5;

FIG. 6 is a bottom view of the guide housing shown in FIG. 4;

FIG. 7 is a bottom perspective view of the guide housing shown in FIGS. 4 to 6; and FIGS. 8 and 9 are partially cross sectioned views of the lower housing assembly shown in FIG. 2, in the direction of view arrows 8—8, showing the function of the relief channels.

DESCRIPTION OF THE PREFERRED EMBODIMENT

Figure 1:
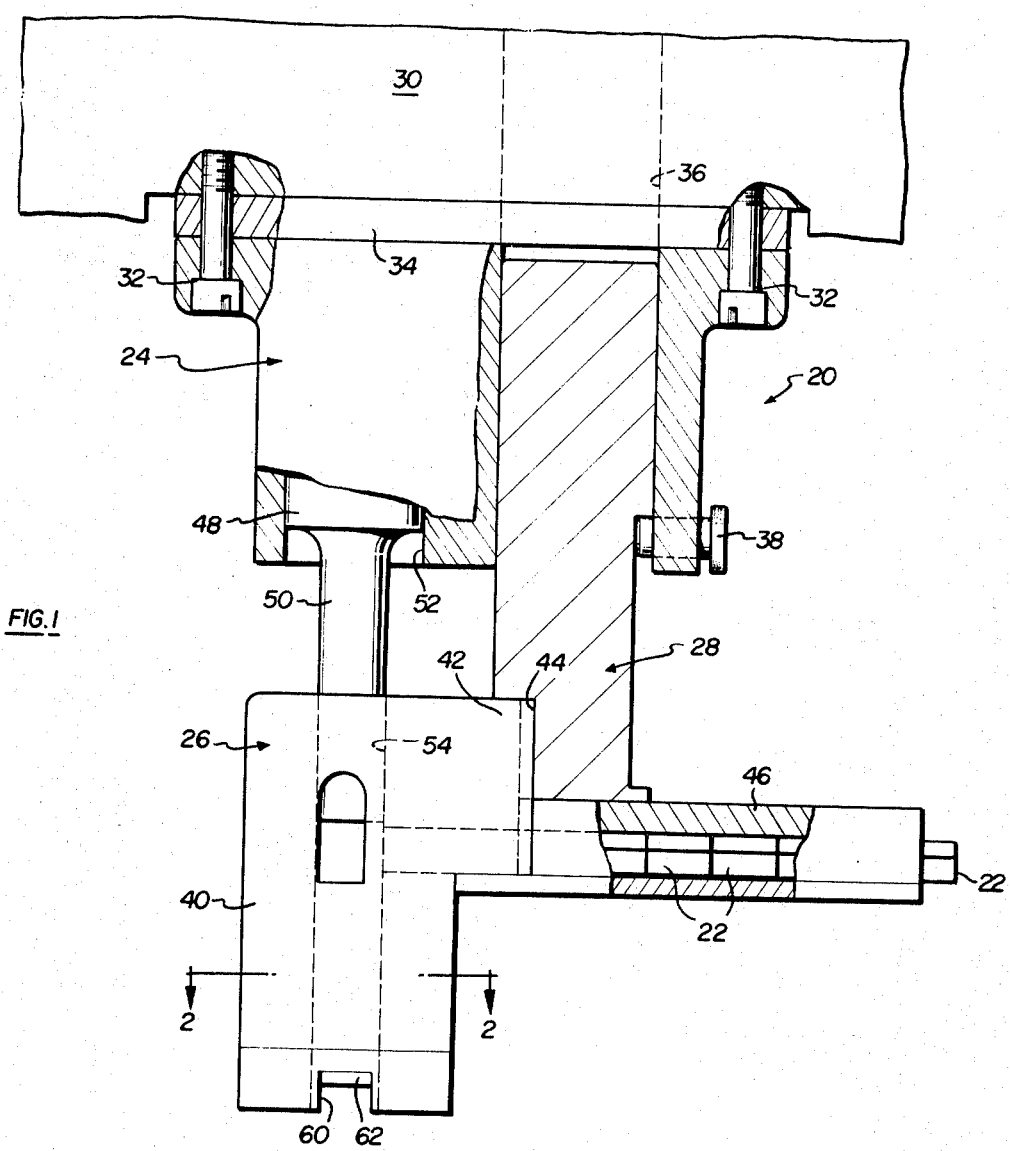
FIG. 1 is a side elevation, partially cross sectioned of one embodiment of the pierce nut installation head of this invention.
Figure 2:
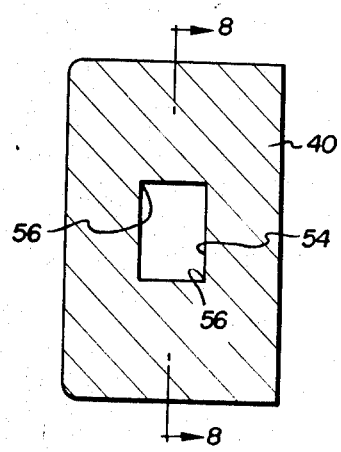
FIG. 2 is a top cross sectional view of the pierce nut installation head shown in FIG. 1, in the direction of view arrows 2—2.

The head assembly 20 shown in FIG. 1 is adapted to receive a plurality of pierce nuts 22 for sequential securement in a panel or the like. The pierce nut installation head shown in FIG. 1 has three main parts, including the upper housing assembly indicated generally at 24, the lower housing indicated generally at 26 and the guide post assembly indicated generally at 28. Many of the details of the disclosed head assembly may be the same as the head assembly shown in U.S. Pat. Nos. 3,089,670 and 3,098,576, which are assigned to the assignee of the instant application. Reference may be had to these patents for details of the upper housing assembly 24 and the guide post assembly 28, for example, which are not disclosed herein. The above reference patents also disclose in more detail the method of installing a pierce nut in a panel, including the method of feeding the pierce nuts to the installation head. In the method disclosed in the above patents, the pierce nuts are fed to the pierce nut installation head 20 through metal or plastic chuting from a rotating hopper or the like. Any suitable feed system may however be utilized in the pierce nut installation head assembly of the invention.

In the disclosed embodiment, the pierce nut installation head 20 is secured in a platen 30 of a punch press or the like by a cap screw 32 which secures the upper housing assembly 24 to the press platen. A plate 34 is provided between the upper housing assembly and the press platen to prevent brinelling of plunger 48 into platen 30. In this embodiment, an aperture 36 is provided in the plate which is configured to receive the guide post assembly 28 as described hereinbelow. The guide post assembly is secured to the upper housing by a retaining pin 38 which is received in a key slot in the guide post assembly, not shown. The guide housing or nose piece 40, which forms part of the lower housing assembly, includes an extension 42 which is received in and secured to a flat recess 44 in the guide post assembly 28.

When the press platen 30 is actuated toward the panel, not shown, the guide housing 40 engages the panel, forcing the guide housing 40 and guide post assembly 28 toward the press platen and the plunger 48 toward the panel. The guide post assembly 28 is received in the configured aperture 36, permitting relative movement between the guide housing 40 and the upper housing assembly and plunger 48.

The pierce nuts are fed to the guide housing 40 through feed chute 46. The plunger 48 in this embodiment is provided with a reduced portion 50 adapted to engage the pierce nuts 22. The configuration of the reduced portion will depend upon the size and shape of the pierce nuts. The plunger 48 is secured within an opening 52 in the upper housing assembly 24. The reduced portion 50 of the plunger is received in a machined passage 54 in the housing guide of nose pierce 40 as described hereinbelow.

Figure 3:
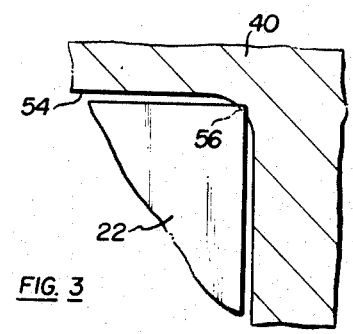
FIG. 3 is an enlarged sectional view of a portion of the pierce nut head shown in FIGS. 1 and 2.

The details of the guide housing 40 are shown in FIGS. 4 to 7, wherein the passage 54 is generally rectangular as shown in FIGS. 4 and 6 to receive a generally rectangular pierce nut. It will be understood that the configuration of the passage will depend upon the shape of the fastener received therethrough. In this embodiment, a plurality of pierce nuts 22 are received in vertically stacked relation, as shown in FIG. 5, for engagement by the plunger 50. The pierce nuts are received through opening 55 to the vertical passage 54. In this embodiment, the fasteners 22 are retained in the vertical passage 54 at the corners of the fastener as shown in FIG. 3. The generally rectangular passage 54 is provided with radiused corners 56 which provide an interference fit with the pierce nuts 22 and releasably retain the fasteners in the passage until engagement by the plunger.

The bottom wall 57 of the guide housing in this embodiment is provided with a pair of configured recesses 58 which prevent the pulling out of a pierce nut after it is installed in the panel. The recesses receive the flanged portion of the pierce nut, after it is received in the panel, providing clearance between the flanged end of the pierce nut and the passage 54, which is restricted by the radiused corners 56 as shown in FIG. 3. The opposed channels 60 provide an explosion relief in the event the pierce nut installation head is recycled as described above and as shown in FIGS. 8 and 9. In the event that the installation head is recycled after installation of a nut, as shown in FIG. 8, the second nut is forced into the pierced hole previously occupied by the first pierce nut as shown in FIG. 9.

In this embodiment, the explosion channels include an inclined bottom wall 62 which is inclined away from the plane of the panel 63, as shown in FIGS. 8 and 9, and a pair of generally vertical side walls 64. The channel opens into the passage 54 at 66 as shown in FIG. 7. It will be understood that the configuration of the channels will depend upon the particular application of the pierce nut head. For example, in certain applications the bottom wall 62 of the channel may be generally parallel to the plane of the panel or even inclined toward the panel, as required by the application.

The pierce nuts 22 in this embodiment of the pierce nut installation head are generally rectangular, as described above, and include a generally rectangular body portion 68, a pilot or piercing face 70 and a pair of opposed flanges 72 opposite the piercing face. The nuts are received in the passage 54 in vertically stacked relation, as shown in FIGS. 8 and 9, with the pilot face 70 disposed toward the panel 63. When the plunger 50 is actuated toward the panel 63, as described above, one of the pierce nuts is forced out of the open end of the passage 54 to pierce the panel 63 as shown in FIG. 8.

If the pierce nut installation head is recycled, wherein another pierce nut is received in the channel 54 and the plunger forces another pierce nut in the panel, the body portion 68 of the first pierce nut is forced through the panel aperture, as shown in FIG. 9, and the second pierce nut is installed in the panel in the place of the first pierce nut. The flanges 72, however, which normally overlie the panel, are sheared off in the second installation step, usually with considerable force. The channels 60 receive the fractured flanges and conduct the fragments away from the passage, preventing damage to the pierce nut installation head and the pierce nuts remaining in the passage 54. If the channels were not provided, the pierce nuts would jam in the head, rendering the pierce nut head useless.

It will be understood that various details of the pilot housing 40 and the pierce nut installation head 20 are dependent upon the particular shape and configuration of the pierce nut to be installed and therefore various modifications may be made to the disclosed pierce nut installation head of this invention without departing from the purview of the claims which follow. For example, the passage 54 could be configured to receive an octagonal pierce nut.

I claim:

1. A pierce nut installation head adapted to receive a plurality of polygonal pierce nuts for sequential installation in a panel adjacent the head, comprising: an actuatable plunger, a guide member having an open ended passage receiving said plunger for reciprocal movement therein, a plurality of polygonal pierce nuts in said passage in stacked relation opposite an end of the plunger, said passage generally peripherally confining said nuts in said stacked relation therein and being somewhat larger than the nuts to permit movement of the nuts therethrough upon engagement by the plunger, portions of said passage engaging at least two corners of the polygonal pierce nuts to provide an interference fit, thereby releasably retaining the nuts in the passage, said plunger actuatable to forcibly engage the uppermost nut in the nut stack and force the lowermost nut out of said open end of the passage against the panel to secure the pierce nut in the panel.

2. The pierce nut installation head defined in claim 1, characterized in that said pierce nuts are generally rectangular and said passage is generally rectangular with radiused corners providing a four point interference fit with said pierce nuts at the corners of said pierce nuts.

3. The pierce nut installation head defined in claim 1, characterized in that said guide member includes a plurality of channels adjacent said open end of the passage communicating with said passage and adapted to receive and guide fragments of the pierce nuts away from the passage in the event that a nut is fragmented during installation.

4. The pierce nut installation head defined in claim 3, characterized in that said channel includes a bottom wall inclined away from the open end of said passage to guide nut fragments away from the panel.

5. A pierce nut installation head adapted to receive a plurality of pierce nuts and sequentially secure said nuts in a panel, said pierce nuts each having a pilot portion for piercing a hole in a panel and a flange portion for overlying the panel adjacent the pierced hole, said pierce nut installation head comprising a plunger, a guide member adapted to be positioned adjacent the panel having an open ended passage receiving said plunger for reciprocal movement therein toward the panel, said pierce nuts being received within said passage between said plunger and the panel in vertical stacked relation, each pierce nut having its pilot portion facing the panel, said plunger actuatable within said passage to force one pierce nut out of the open end of said passage toward the panel, causing the pilot portion of said one pierce nut to pierce the panel, and said guide member having a channel adjacent said open end of the passage, communicating with said passage and having an open end remote from said passage, said channel functioning, in the event said flange portion is fractured to (1) receive fragments of the flange portion of said pierce nut, (2) guide the fragments away from said passage, and (3) prevent damage to the pierce nuts remaining in said passage.

6. The pierce nut installation head defined in claim 5, characterized in that said pierce nuts each include two opposed flange portions and said guide member includes two opposed channels extending away from opposed sides of said passage, generally aligned with said flange portions.

7. The pierce nut installation head defined in claim 5, characterized in that said channel have a bottom wall inclined away from the plane of said panel to guide said fragments away from said panel.

8. The pierce nut installation head defined in claim 5, characterized in that said pierce nuts are polygonal having a plurality of corners and said passage in the guide member engages at least two corners of the pierce nuts to provide an interference fit, thereby releasably retaining the nuts in the passage.

9. The pierce nut installation head defined in claim 8, characterized in that said pierce nuts are each generally rectangular and said passage is generally rectangular with radiused corners providing a four point interference fit with said pierce nuts at the corners of each of said pierce nuts.

* * * * *